United States Patent [19]
Cooper

[11] 3,837,270
[45] Sept. 24, 1974

[54] PORTABLE ELECTRICALLY HEATED COMBINATION OVEN BOILER AND OPEN GRATE COOKING UNIT

[76] Inventor: Thomas V. Cooper, 2100 St. Charles Ave., Apt. 8-J, New Orleans, La. 70140

[22] Filed: Mar. 26, 1974

[21] Appl. No.: 454,975

[52] U.S. Cl. ............... 99/339, 99/403, 99/422, 219/394, 219/408, 219/445, 219/386
[51] Int. Cl. ............... A47j 37/06, A47j 37/12
[58] Field of Search ...... 99/339, 403, 422; 219/214, 219/385, 386, 394, 400, 406, 408, 445, 521

[56] References Cited
UNITED STATES PATENTS

| | | | |
|---|---|---|---|
| 2,556,597 | 6/1951 | Pierson | 219/408 |
| 2,817,331 | 12/1957 | Kaplan | 126/41 |
| 2,949,525 | 8/1960 | Dunn | 99/339 X |
| 2,964,609 | 12/1960 | Anoff | 219/394 |
| 2,980,101 | 4/1961 | Anetsberger et al. | 99/339 X |
| 3,041,440 | 6/1962 | Dills | 219/394 |
| 3,059,087 | 10/1962 | Perlman | 219/394 |
| 3,142,748 | 7/1964 | Warren | 219/394 X |
| 3,176,118 | 3/1965 | Scott | 219/394 |
| 3,353,476 | 11/1967 | Goodman et al. | 99/339 X |
| 3,447,444 | 6/1969 | Berger et al. | 99/339 X |

Primary Examiner—Volodymyr Y. Mayewsky

[57] ABSTRACT

A portable electric cooking unit including an upright rectangular housing having a horizontal partition forming a lower door opened and closed oven compartment and an upper door opened and closed boiling compartment and having a griddle supported above its top wall. A closable baking and roasting container is freely received by the oven compartment and a plurality of upwardly open containers are removably received by the boiling compartment.

6 Claims, 4 Drawing Figures

PATENTED SEP 24 1974

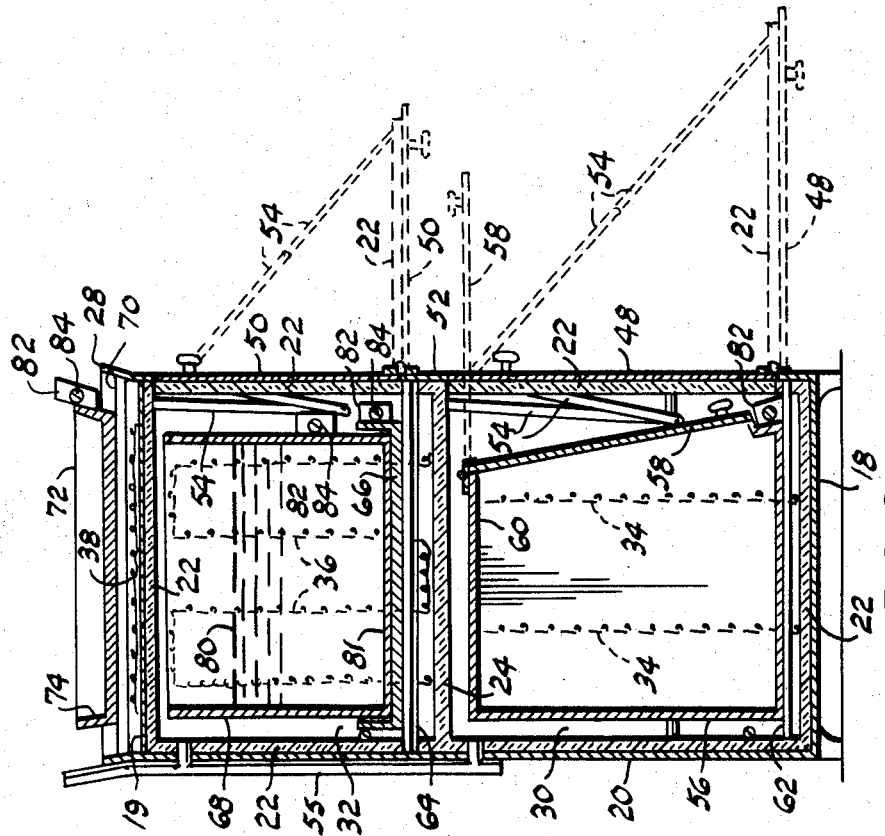

PORTABLE ELECTRICALLY HEATED COMBINATION OVEN BOILER AND OPEN GRATE COOKING UNIT

BACKGROUND OF THE INVENTION

1. Field of the invention

The present invention relates to food preparation and more particularly to a compact portable food preparation unit for selectively or simultaneously baking, boiling, frying or deep fat frying foods.

2. Description of the prior art

Small portable electric cooking devices have generally been directed toward an oven type device for baking, some of which have provisions for broiling, as for example as shown by U.S. Pat. No. 3,714,394, which discloses a separable housing forming an oven in one embodiment which may have its top housing portion removed for frying, or the like, over an open grate.

This invention provides an electrically heated housing having an oven compartment for baking or roasting and a superposed cooking compartment having removable containers for holding liquids for boiling and further including a compartmentalized griddle overlying the top surface of the housing so that foods may be simultaneously baked, boiled and fried.

SUMMARY OF THE INVENTION

An upright rectangular housing is provided with a horizontal partition forming upper and lower cooking compartments respectively opened and closed by doors forming the major portion of the front wall surface of the housing. Electrical resistance heating elements, connected with a source of electrical energy, extend along the inner surface of the housing side walls and across the respective upper surface of the housing bottom wall, partition wall and top wall. A door opened and closed baking and roasting container is removably received by the lower or oven compartment and a plurality of upwardly open liquid containers are supported in juxtaposed relation by a boiler base in the upper or boiler compartment. A compartmentalized griddle, having short upstanding walls surrounding the respective compartment, overlies the top wall of the housing. At least one wire basket, removably received by the respective boiler liquid containers, is provided for deep fat frying. The oven container, boiling containers and griddle are respectively provided with handle engageable lifting lugs for movement into or out of the housing while hot.

The principle object of this invention is to provide a multiple purpose, portable and compact cooking unit for simultaneously cooking a plurality of different food items, for conservation of energy, such as roasting, baking, boiling or frying, by means of removable utensils which may also be used on conventional stoves.

BRIEF DESCRIPTION OF THE DRAWINGS

FIGS. 2 and 3 are vertical cross sectional views taken substantially along the lines 2—2 and 3—3, respectively, of FIG. 1; and, FIG. 4 is an exploded perspective view of one of the boiling compartment containers, a deep fry basket and lifting handle.

DESCRIPTION OF THE PREFERRED EMBODIMENT

Figure 1:
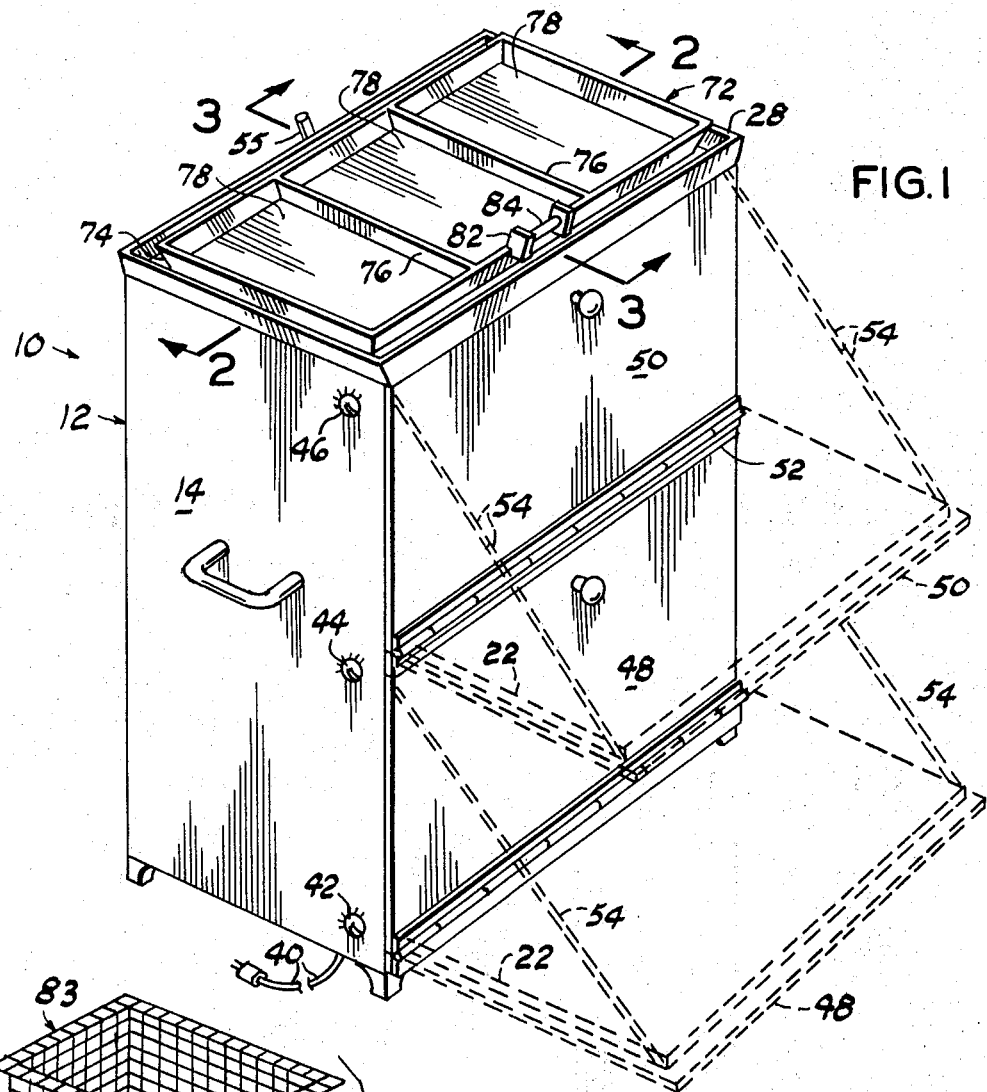
FIG. 1 is a perspective view of the cooker illustrating, by dotted lines, the oven and boiler compartment doors in open position.
Figure 4:
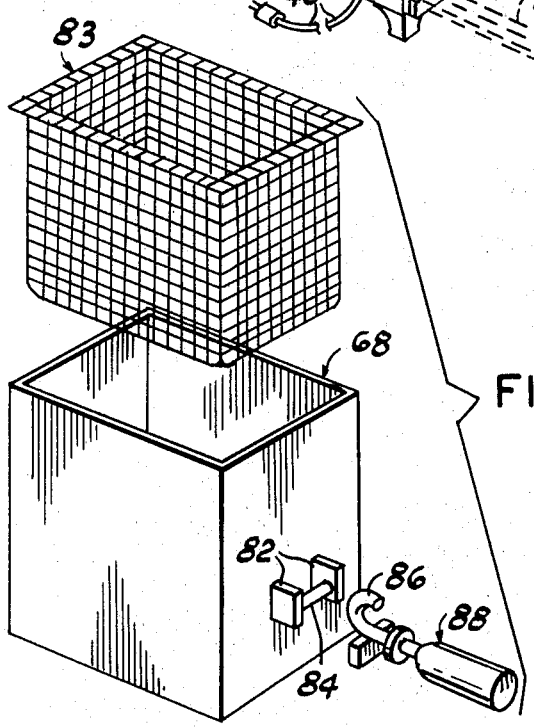

Like characters of reference designate like parts in those figures of the drawings in which they occur.

In the drawings:

The reference numeral 10 indicates the cooker, as a whole, which is upright rectangular in general configuration, comprising a lifting handle equipped housing 12 having side walls 14 and 16, a bottom wall 18, and a top wall 19 joined to a back wall 20. A layer or panel of insulating material 22 contaguously contacts the respective inner surface of the side walls 14-16, top wall 19, back wall 20 and upper surface of the bottom wall 18. A panel of the insulating material 22 transversely extends between the side walls to form a horizontal partition 24 defining a lower oven or cooking compartment 30 and an upper boiling or cooking compartment 32. The front, back and side walls of the housing extend above the top wall to form an upwardly and outwardly flanged top marginal wall 28.

An oven compartment electrical resistance heating element 34 extends along the inner surface of the side wall insulating material and across the upper surface of the insulating material overlying the bottom wall 18. A boiler compartment electrical resistance heating element 36 similarly extends along the insulated inner side wall and upper surfaces of the partition 24 in the compartment 32. A fryer heating element 38 overlies the upper surface of the top wall 19. Each of the heating elements 34, 36 and 38 are individually connected with a source of electrical energy by wiring 40 and operated by control knobs 42, 44 and 46, respectively.

The oven compartment 30 is opened and closed by a handle equipped oven door 48 hingedly connected horizontally at its lower limit adjacent the depending limit of the housing for vertical pivoting movement of the door about the horizontal axis of its hinged connection. Similarly, the boiler compartment 32 is provided with a handle equipped door 50 hingedly connected to a front door support 52 extending between the side walls 14 and 16 at the front of the housing. A panel of the insulating material overlies the inner surface of the respective door. The doors 48 and 50 are each provided with door supports comprising pairs of hingedly connected links 54 respectively connected to the lateral limits of the doors and inner surface of the housing side walls, for supporting the respective door when in opened position (FIGS. 1 and 3). A relatively small exhaust or vent pipe 55, connected with the compartments 30 and 32, is vertically supported by the back wall 20, projects, at its upper end, above the housing flange wall 28.

The oven compartment 30 is provided with a substantially rectangular baking or roasting container 56 dimensioned to be loosely received within the oven compartment and characterized by a handle equipped door portion 58 hingedly connected horizontally to its top wall 60. The oven container 56 is supported within the oven compartment 30 by a plurality of rods 62 extending transversely through the oven compartment adjacent its lower limit. Similarly, a plurality of rods 64, extending transversely through the boiler compartment 32 above the partition wall 24, support a removable boiler container base 66. A plurality, three in the example shown, of boiler containers 68, upwardly open rectangular in general configuration, are supported in juxtaposed relation by the boiler support 66. Similar rod supports 70 transversely overlying the top wall 19, support a griddle 72.

The griddle 72 is rectangular in general configuration having overall dimensions slightly less than the top flanged wall 28 of the housing and is loosely received thereby when supported by the rods 70. The griddle is characterized by a short upwardly and outwardly directed peripheral wall 74 and a pair of transverse partition walls 76 forming a plurality, three in the example shown, of upwardly open equal area frying surfaces or compartments 78. The boiler containers 68 normally contain a cooking liquid 80. The bottom wall 81 of the boiler containers 68 are dimensioned to be received in contiguous contact with the respective frying compartment surface.

An upwardly open generally rectangular wire basket 83, having an outwardly flanged upper edge, is dimensioned to be freely received by each of the boiler compartments 68 for deep fat frying, or the like. The oven container 56, boiler base support 66, boiler containers 68 and griddle 72 are each provided with lifting lugs 82 joined by a horizontal cross bar 84 for removable engagement with the J-shaped hook end 86 of a lifting handle 88.

OPERATION

Operation of the cooker seems obvious. The wires 40 are connected to a source of electrical energy, not shown, and articles to be roasted, or baked are placed in the oven container 56 within the oven compartment 30. A desired quantity of liquid, covering contained food within one or more of the boiler containers 68, is placed within the boiler compartment 32 and articles to be fried are placed within the desired compartment 78 of the griddle 72.

Alternatively, one or more of the boiler containers 68 may be placed within selected griddle compartments 78 with cooking oil in the selected boiler container and by use of the wire basket 82 deep fat frying of food may be achieved. Since the oven container 56, boiler containers 68 and griddle 72 are all removable from the housing by means of the handle 88, they are easily cleaned and maintained in a sanitary condition.

Obviously the invention is susceptible to changes or alterations without defeating its practicability, therefore, I do not wish to be confined to the preferred embodiment shown in the drawings and described herein.

I claim:

1. A portable electrically heated combination oven, boiler and open grate cooking unit, comprising:
   an upright rectangular housing having interconnected top, bottom, back and side walls defining an open front for said housing;
   a partition horizontally dividing said housing intermediate its height and forming upper and lower cooking compartments;
   a lower door hingedly connected with said housing adjacent its bottom wall for opening and closing the lower cooking compartment;
   an upper door hingedly connected with said housing adjacent the plane of said partition for opening and closing the upper cooking compartment;
   electrical resistance heating elements disposed adjacent the inner surface of said side walls and overlying the upper surface of said bottom wall, said partition and said top wall;
   wiring connecting said heating elements with a source of electrical energy; and,
   a griddle having a perimeter wall overlying the heating elements on said top wall,
      said griddle having a pair of transverse division walls forming a plurality of substantially equal area cooking surfaces.

2. The cooking unit according to claim 1 and further including:
   a box-like roasting and baking container having a door removably received loosely by said lower cooking compartment.

3. The cooking unit according to claim 2 and further including:
   a plurality of upwardly open liquid containers removably received in juxtaposed relation by said upper cooking compartment; and,
   a container support base interposed between said partion and said liquid containers.

4. The cooking unit according to claim 3 in which said
   liquid containers each have a bottom surface dimensioned to be supported by the respective equal area cooking surface of said griddle in contiguous contacting relation; and,
   at least one upwardly open wire basket dimensioned to be removably received by said liquid containers.

5. The cooking unit according to claim 4 and further including:
   lifting means connected with each said container and said griddle, respectively,
      each said lifting means comprising a pair of lugs interconnected by a horizontal cross bar; and,
   a J-hook shaped handle removably engageable with said cross bar.

6. The cooking unit according to claim 5 in which said housing is provided with a vent pipe communicating with said upper and said lower cooking compartments, respectively.

* * * * *